United States Patent [19]

Okinoshima et al.

[11] Patent Number: 5,051,467

[45] Date of Patent: Sep. 24, 1991

[54] SILICONE RUBBER COMPOSITIONS

[75] Inventors: Hiroshige Okinoshima; Tsutomu Kashiwagi, both of Annaka, Japan

[73] Assignee: Shin-Etsu Chemical Co., Ltd., Tokyo, Japan

[21] Appl. No.: 441,555

[22] Filed: Nov. 27, 1989

[30] Foreign Application Priority Data

Nov. 28, 1988 [JP] Japan .................................. 63-300327

[51] Int. Cl.$^5$ .............................................. C08K 5/24
[52] U.S. Cl. .................................... 524/731; 524/265; 524/267; 528/15
[58] Field of Search ................... 528/15; 524/265, 267, 524/730, 731

[56] References Cited

U.S. PATENT DOCUMENTS 4,704,408 11/1987 Krug et al. ............................. 528/15
4,931,485 6/1990 Inoue et al. ............................ 528/15

Primary Examiner—Melvyn I. Marquis
Attorney, Agent, or Firm—Birch, Stewart, Kolasch & Birch

[57] ABSTRACT

A silicon rubber composition comprising (I) a vinyl-containing diorganopolysiloxane, (II) an organohydrogenpolysiloxane, and (III) platinum or a platinum compound is improved in adhesive bond to various substrates under low-temperature curing conditions by blending (IV) an ester siloxane compound free of a silicon-to-carbon bond and (V) an epoxy-containing polysiloxane compound.

9 Claims, No Drawings

SILICONE RUBBER COMPOSITIONS

This invention relates to silicone rubber compositions having improved self-adhesive properties and adapted for use as protective coating compositions and adhesive compositions for electronic and electric parts, as well as to cured products thereof.

BACKGROUND OF THE INVENTION

In the prior art, there are known silicone rubber compositions of the type wherein vinylpolysiloxane and hydrogenpolysiloxane are heat cured in the presence of a platinum catalyst through hydrosilation. These silicone rubber compositions are self-adhesive and thus useful as protective coating compositions for electronic and electric parts and as adhesive compositions for bonding electronic and electric parts to boards.

The prior art silicone rubber compositions of this type, however, are not necessarily highly adhesive to various substrates, particularly to such substrates as metals, ceramics, and plastics.

Japanese Patent Publication Nos. 13508/1978 and 5836/1982 disclose to add adhesive aids such as a hydrogenpolysiloxane having an epoxy or ester group, an ester silane compound or a hydrolyzate thereof to the silicone rubber compositions in order to increase their adhesion to various substrates.

The adhesion of the silicone rubber compositions largely depends on the temperature during curing. The silicone rubber compositions must be heat cured to the substrates at a minimum temperature of 100° to 120° C. even in the presence of the adhesive aids. Low temperature curing at temperatures of lower than 100° C. often fails to achieve a satisfactory bond. If these silicone rubber compositions are cured at low temperatures as adhesives for electronic and electric parts, then non-bonded gaps are undesirably left between the parts and the silicone rubber composition, through which humidity and impurities will reach the parts, causing corrosion and deficient insulation to the parts.

The demand for low temperature curing is currently increasing partly as a new application and partly for an energy saving. It is thus desired to develop a silicone rubber composition capable of forming a firm bond through low-temperature curing.

SUMMARY OF THE INVENTION

An object of the present invention is to provide a silicone rubber composition having improved self-adhesive properties so that it can be cured to various substrates under low-temperature conditions. Another object of the present invention is to provide a cured product of the silicone rubber composition.

According to the present invention, there is provided a silicone rubber composition comprising (I) a vinyl-containing diorganopolysiloxane having at least two $CH_2=CH-Si\equiv$ bonds per molecule,
(II) an organohydrogenpolysiloxane having at least two hydrogen atoms directly attached to silicon atoms per molecule,
(III) platinum or a platinum compound,
(IV) an ester siloxane compound free of a silicon-to-carbon bond having the general formula:

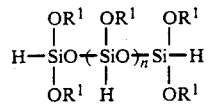

wherein $R^1$ is a monovalent hydrocarbon group having 1 to 10 carbon atoms, preferably 1 to 7 carbon atoms, free of an aliphatic unsaturated bond, and letter n is 0 or a positive integer of 1 to 20, and (V) an epoxy-containing polysiloxane compound having at least one epoxy group linked to a silicon atom via a carbon atom directly attached to the silicon atom per molecule.

We have discovered that a silicone rubber composition obtained by blending components (IV) and (V) to a silicone rubber composition comprising components (I), (II), and (III) as defined above has sufficient self-adhesive properties to bond to various substrates such as metals, ceramics, and plastics by curing for a relatively short time at low temperatures of up to 100° C. Then the silicone rubber composition can be widely used as protective coating compositions and adhesive compositions for electronic and electric parts.

DETAILED DESCRIPTION OF THE INVENTION

Component (I) of the silicone rubber composition of the invention is a vinyl-containing diorganopolysiloxane having at least two $CH_2=CH-Si\equiv$ bonds per molecule. In the vinyl-containing diorganopolysiloxane, the vinyl groups may be present either at only both ends of the molecule or at both ends and intermediate positions of the molecule. Preferred is a vinyl-containing diorganopolysiloxane having the formula:

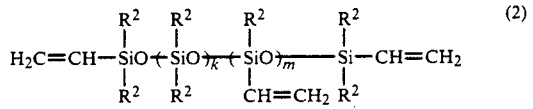

wherein $R^2$ is a monovalent hydrocarbon group having 1 to 10 carbon atoms, preferably 1 to 6 carbon atoms, free of an aliphatic unsaturated bond, letter k is 0 or a positive integer, m is 0 or a positive integer, and the sum of k and m meets $0 < k+m \leq 10,000$.

Substituent $R^2$ in formula (2) is selected from substituted or unsubstituted monovalent hydrocarbon groups free of an aliphatic unsaturated bond, for example, lower alkyl groups such as methyl, ethyl, propyl, and butyl, aryl groups such as phenyl, tolyl, xylyl, and benzyl, cycloalkyl groups such as cyclohexyl, and substituted ones of these groups in which some or all of the hydrogen atoms are substituted with halogen atoms, cyano groups or the like, for example, chloromethyl, cyanoethyl, and 3,3,3-trifluoropropyl. Letter k is 0 or a positive integer, m is 0 or a positive integer, and the sum of k and m meets $0 < k+m \leq 10,000$, preferably $0 < k+m \leq 2,000$ and $0 < m/(k+m) \leq 0.2$.

The diorganopolysiloxane of formula (2) preferably has a viscosity of about 10 to about 1,000,000 centistokes at 25° C.

Component (II) of the silicone rubber composition of the invention is an organohydrogenpolysiloxane having at least two hydrogen atoms directly attached to silicon atoms per molecule. Preferred is an organohydrogenpolysiloxane having at least two hydrogen atoms directly attached to silicon atoms per molecule, represented by the formula:

$$H_a R^3{}_b SiO_{(4-a-b)/2} \quad (3)$$

wherein $R^3$ is a monovalent hydrocarbon group having 1 to 10 carbon atoms, preferably 1 to 7 carbon atoms, free of an aliphatic unsaturated bond, letters a and b have values in the range: $0<a<2$, $1 \leq b \leq 2$, and $2 \leq a+b \leq 3$, preferably in the range: $0.3 \leq a \leq 1$ and $2 \leq a+b \leq 2.7$.

Substituent $R^3$ in formula (3) is selected from substituted or unsubstituted monovalent hydrocarbon groups free of an aliphatic unsaturated bond, which are the same as defined for $R^2$ in formula (2), for example, lower alkyl groups such as methyl and aryl groups such as phenyl.

The organohydrogenpolysiloxanes defined above are generally prepared by hydrolysis of chlorosilanes such as $R^3SiHCl_2$, $R^3{}_3SiCl$, $R^3{}_2SiCl_2$, and $R^3{}_2SiHCl$ or further equilibration of the siloxane resulting from hydrolysis. Illustrative examples of the organohydrogenpolysiloxane are given below.

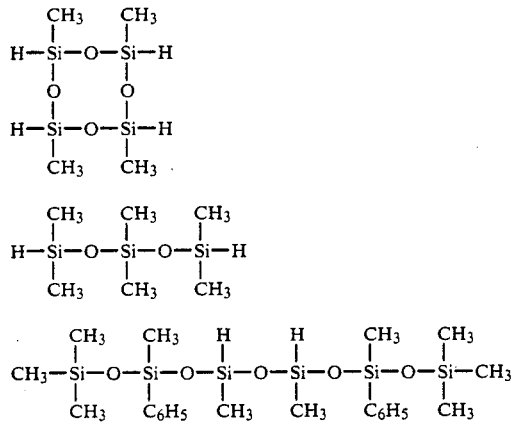

Component (II) or organohydrogenpolysiloxane may be blended in the composition in any desired amount. It is preferably blended in such an amount with component (I) or vinyl-containing diorganopolysiloxane that the organohydrogenpolysiloxane affords 2 to 4 hydrogen atoms per vinyl group of the diorganopolysiloxane.

Component (III) of the silicone rubber composition of the invention is platinum or a platinum compound. It is a catalyst for effecting addition reaction between silicon-attached vinyl groups in the vinyl-containing diorganopolysiloxane (I) and silicon-attached hydrogen atoms in the organohydrogenpolysiloxane (II). It may be selected from those catalysts commonly used in conventional silicone rubber compositions of this type.

Examples of the platinum or platinum compound include elemental platinum, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_6 \cdot nH_2O$, $PtCl_4 \cdot nH_2O$, $PtCl_2$, $Na_2PtCl_4 \cdot nH_2O$, and $H_2PtCl_4 \cdot nH_2O$. Also employable are complexes of these platinum compounds with hydrocarbons, alcohols, and vinyl-containing cyclic siloxanes.

The amount of platinum or platinum compound added is a catalytic amount, for example, in the range of from 0.1 to 100 parts by weight of platinum per million parts of the total weight of organopolysiloxanes (I) and (II).

According to the feature of the present invention, component (IV) in the form of an ester siloxane compound having formula (1) and component (V) in the form of an epoxy-containing polysiloxane compound are blended in an addition reaction type silicone rubber composition containing components (I), (II), and (III) as defined above. The objects of the invention are achieved by blending the ester siloxane compound and epoxy-containing polysiloxane compound because the composition is thereby improved in adhesion.

The ester siloxane compound free of a silicon-to-carbon bond (IV) has the general formula:

wherein $R^1$ is a monovalent hydrocarbon group having 1 to 10 carbon atoms, preferably 1 to 7 carbon atoms, and letter n is 0 to 20. In formula (1), $R^1$ is selected from substituted and unsubstituted monovalent hydrocarbon groups free of an aliphatic unsaturated bond, which are the same as defined for $R^2$ in formula (2), for example, lower alkyl groups such as methyl, ethyl, and propyl and aryl groups such as phenyl, with the lower alkyl groups being preferred. Letter n is 0 or a positive integer of 1 to 20, preferably a positive integer of 1 to 6. The compound of formula (1) can be sufficiently effective to achieve the objects of the invention when n is 0 or more whereas it becomes more compatible with the base oils when n is 1 to 6.

The ester siloxane compound of formula (1) may be synthesized, for example, by adding an appropriate amount of water to a trialkoxysilane such as trimethoxysilane, triethoxysilane, and tripropoxysilane for acid catalytic hydrolysis. The molecular weight of the resulting compound of formula (1), that is, the value of n can be controlled by adjusting the amount of water added for hydrolysis.

Although a trialkoxysilane can be similarly used as the ester siloxane compound of formula (1) as just described, the trialkoxysilane is less desirable. As compared with the ester siloxane compound of formula (1), the trialkoxysilane is too volatile to improve the adhesion of the composition.

Component (V), epoxy-containing polysiloxane compound has at least one epoxy group linked to a silicon atom via a carbon atom directly attached to the silicon atom per molecule. Preferably, the epoxy-containing polysiloxane compound has the formula:

$$R^4{}_c R^5{}_d SiO_{(4-c-d-)/2} \quad (4)$$

wherein $R^4$ is

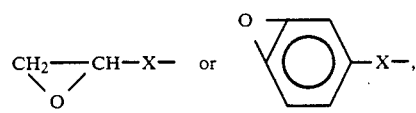

X is a divalent organic group having 1 to 6 carbon atoms such as $-(CH_2)_{1-6}-$ and $(CH_2)_{1-3}-O-(CH_2)_{1-3}-$, $R^5$ is hydrogen or a monovalent hydrocarbon group having 1 to 10 carbon atoms as defined for $R^2$ and $R^3$, and letters c and d have values in the range: $0 < c \leq 1$, $1 \leq d < 3$, and $1.5 \leq c+d \leq 3$, preferably $1.8 \leq c+d \leq 2.2$.

For example, the epoxy-containing polysiloxane compounds are cyclic or chain polysiloxanes having at least one cyclic or non-cyclic epoxy group added thereto. Illustrative examples of the epoxy-containing polysiloxane compound are given by the following formulae (5) and (6).

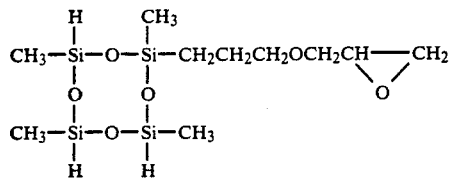

(5)

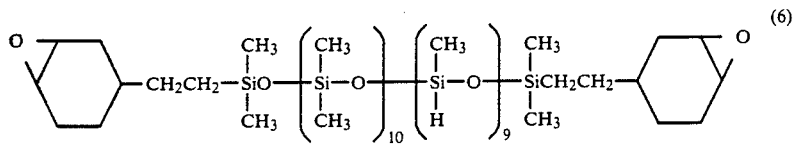

(6)

The amounts of components (IV) and (V) blended are not particularly limited as long as they are effective to render the composition more adhesive. Preferably, component (IV), ester siloxane compound is blended in an amount of 0.01 to 5% by weight, more preferably 0.1 to 1% by weight and component (V), epoxy-containing organopolysiloxane is blended in an amount of 0.1 to 5% by weight, more preferably 0.2 to 2% by weight, based on the total weight of component (I), vinyl-containing organopolysiloxane and component (II), organohydrogenpolysiloxane.

In addition to components (I) through (V) as defined above, the silicone rubber composition of the invention may contain any desired additives, for example, reinforcing or non-reinforcing inorganic fillers. Examples of the reinforcing inorganic filler include fumed silica and fumed titanium dioxide. Examples of the non-reinforcing inorganic filler include those fillers commonly used in conventional silicone rubber compositions of this type, such as ground quartz, calcium carbonate, calcium silicate, titanium dioxide, ferric oxide, and carbon black. Although the inorganic filler need not be added to the silicone rubber composition, the amount of the inorganic filler blended may range from 0 to 200 parts by weight per 100 parts by weight of the entire composition (exclusive of the filler).

Like conventional silicone rubber compositions, the silicone rubber composition of the invention may be divided into two parts whereupon the two parts are mixed for curing on use. The silicone rubber composition of the invention may also be a one-part composition to which a minor amount of a curing inhibitor (e.g., acetylene alcohol) is preferably added.

When the composition of the invention is divided into two parts, preferably a first part is a blend of vinyl-containing organopolysiloxane (I) and platinum or platinum compound (III) and a second part is based on organohydrogenpolysiloxane (II). The ester siloxane compound (IV) and epoxy-containing organopolysiloxane (V) may be added to either the first part or the second part. Components (IV) and (V) may be added to the same or different parts.

The silicone rubber composition of the invention may be cured under conditions commonly used for conventional silicone rubber compositions. The silicone rubber composition of the invention can provide a satisfactory bond even when it is cured at relatively low temperatures of up to 100° C., especially 80° to 90° C. for relatively short times of about ½ to about 2 hours. This low-temperature curing nature makes the composition useful as a protective coating composition for various substrates of electric and electronic parts and as an adhesive for bonding electric and electronic parts to boards, for example.

There has been described a silicone rubber composition having improved self-adhesive properties. It can be cured to various substrates under low-temperature, short-time conditions. A cured product of the silicone rubber composition protects the associated parts from corrosion and deficient electrical insulation. Thus the silicone rubber composition can be employed in a wide variety of applications, particularly as protective coating compositions and adhesives for electric and electronic parts. The low-temperature curing nature allows the composition to be applied to less heat resistant parts and to find a novel application. Energy saving and cost reduction features are also available.

EXAMPLE

Examples of the present invention are given below by way of illustration and not by way of limitation. All parts and percents are by weight unless otherwise stated.

EXAMPLE 1 AND COMPARATIVE EXAMPLES 1-4

A composition was prepared by blending
100 parts of dimethylpolysiloxane having two methylvinylsiloxane units per molecule (400 centistokes),
5.0 parts of methylhydrogenpolysiloxane having 1.0 mol of ≡SiH bond per 100 grams,
0.05 parts of an octyl alcohol solution of chloroplatinic acid (platinum content 2%),
30 parts of ground quartz,
0.15 parts of a hydrolyzate of trimethoxysilane which was obtained as a mixture of compounds having the formula:

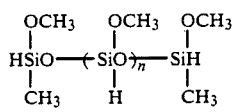

wherein n is 0 to 5 by adding 0.5 mol of water to 1 mol of trimethoxysilane for acid catalytic hydrolysis, followed by fractional distillation, and
1.5 parts of an epoxy-containing siloxane of formula (4) which was obtained by partial addition of 1 mol of allylglycidyl ether to 1 mol of 1,3,5,7.tetramethylcyclotetrasiloxane.

The composition was fully agitated, applied to five different substrates as shown in Table 1 as a film of 5 cm by 2 cm by 2 mm thick, and heat cured at 80° C for 2 hours, obtaining test specimens (Example 1).

The test specimens were subjected to a qualitative adhesion test by the following procedure.

ADHESION TEST

The cured film was broken by means of a microspatula and stripped off from the substrate. The proportion of cohesive failure areas and stripped areas was examined to evaluate the adhesive bond.

RATINGS

○: st ɔng bond (resin remaining area more than 80%)
Λ: na ial bond (resin remaining area 20.80%)
⨯ : ɔond (resin remaining area less than 20%)

rt t specimens were prepared from comparative compositions by following substantially the same formulation and procedure as Example 1. Comparative Example 1 corresponded to a composition which was free of the epoxy-containing siloxane. Comparative Example 2 corresponded to a composition which was free of the trimethoxysilane hydrolyzate. Comparative Example 3 corresponded to a composition which was free of both the epoxy-containing siloxane and the trimethoxysilane hydrolyzate. Comparative Example 4 corresponded to a composition which contained 0.15 parts of a trimethoxysilane instead of the trimethoxysilane hydrolyzate.

The results of an adhesion test on these comparative specimens are shown in Table 1.

TABLE 1

| | Examples | | | | |
|---|---|---|---|---|---|
| | E1 | CE1 | CE2 | CE3 | CE4 |
| Component | | | | | |
| Trimethoxysilane hydrolyzate | yes | yes | no | no | no* |
| Epoxy-containing siloxane | yes | no | yes | no | yes |
| Substrate | | | | | |
| Aluminum | ○ | ⨯ | ⨯ | ⨯ | Δ |
| Stainless steel | ○ | ⨯ | ⨯ | ⨯ | Δ |
| Nickel | ○ | ⨯ | ⨯ | ⨯ | ⨯ |
| Silicon wafer | ○ | ⨯ | ⨯ | ⨯ | Δ |
| Glass | ○ | Δ | ⨯ | ⨯ | Δ |

*containing trimethoxysilane

As is evident from the data of Table 1, the organopolysiloxane composition of the invention (Example 1) shows an improved bond to metal substrates such as aluminum, stainless steel, and nickel, silicon wafer, and glass. In contrast, the compositions which do not contain the trimethoxysilane hydrolyzate and/or the epoxy-containing siloxane (Comparative Examples 1.3) do not firmly bond to the substrates. The composition which contains the epoxy-containing siloxane, but the trimethoxysilane instead of the trimethoxysilane hydrolyzate (Comparative Example 4) shows a less satisfactory bond to the substrates.

EXAMPLE 2 AND COMPARATIVE EXAMPLES 5-7

A composition was prepared by blending
50 parts of dimethylpolysiloxane having two methylvinylsiloxane units per molecule (400 centistokes),
50 parts of a copolymer consisting of an $SiO_2$ unit, a trimethylsiloxy unit, and a dimethylvinylsiloxy unit in a molar ratio of 1:1:0.15,
6.0 parts of methylhydrogenpolysiloxane having 1.2 mol of $\equiv SiH$ bond per 100 grams,
0.05 parts of an octyl alcohol solution of chloroplatinic acid (platinum content 2%),
0.05 parts of a siloxane-modified acetylene alcohol,
0.35 parts of the same hydrolyzate of trimethoxysilane as in Example 1 per 100 parts of the dimethylpolysiloxane, and
2.0 parts of an epoxy-containing siloxane of formula (5).

The composition was fully agitated, applied to nine different substrates as shown in Table 2 as a film of 5 cm by 2 cm by 2 mm thick, and heat cured at 100° C. for 1 hour, obtaining test specimens (Example 2). These specimens were examined for adhesive bond by the same procedure as in Example 1.

Test specimens were prepared from comparative compositions by following substantially the same formulation and procedure as Example 2. Comparative Example 5 corresponded to a composition which was free of the epoxy-containing siloxane. Comparative Example 6 corresponded to a composition which was free of the trimethoxysilane hydrolyzate. Comparative Example 7 corresponded to a composition which was free of both the epoxy-containing siloxane and the trimethoxysilane hydrolyzate.

The results of an adhesion test on these comparative specimens are shown in Table 2.

TABLE 2

| | Examples | | | |
|---|---|---|---|---|
| | E2 | CE5 | CE6 | CE7 |
| Component | | | | |
| Trimethoxysilane hydrolyzate | yes | yes | no | no |
| Epoxy-containing siloxane | yes | no | yes | no |
| Substrate | | | | |
| Aluminum | ○ | ⨯ | ⨯ | ⨯ |
| Stainless steel | ○ | ⨯ | ⨯ | ⨯ |
| Nickel | ○ | ⨯ | ⨯ | ⨯ |
| Silicon wafer | ○ | Δ | Δ | ⨯ |
| Glass | ○ | Δ | Δ | ⨯ |
| Polyester | ○ | Δ | Δ | ⨯ |
| Polyimide | ○ | ⨯ | ⨯ | ⨯ |
| Glass epoxy | ○ | Δ | Δ | ⨯ |
| Phenol resin | ○ | Δ | Δ | ⨯ |

As is evident from the data of Table 2, the organopolysiloxane composition of the invention (Example 2) shows an improved bond to metal substrates such as aluminum, stainless steel, and nickel, silicon wafer, and glass as well as to plastic substrates including polyester, polyimide, glass-reinforced epoxy, and phenol resins, as compared with the compositions which do not contain the trimethoxysilane hydrolyzate and/or the epoxy-containing siloxane (Comparative Examples 5-7).

Although some preferred embodiments have been described, many modifications and variations may be made thereto in the light of the above teachings. It is therefore to be understood that within the scope of the appended claims, the invention may be practiced otherwise than as specifically described.

We claim:
1. A silicone rubber composition comprising
(I) a vinyl-containing diorganopolysiloxane having at least two $CH_2=CH-Si\equiv$ bonds per molecule,

(II) an organohydrogenpolysiloxane having at least two hydrogen atoms directly attached to silicon atoms per molecule,
(III) platinum or a platinum compound,
(IV) an ester siloxane compound free of a silicon-to-carbon bond having the general formula:

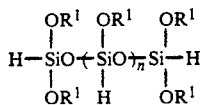  (1)

wherein $R^1$ is a monovalent hydrocarbon group having 1 to 10 carbon atoms and free of an aliphatic unsaturated bond, and letter n is 0 or a positive integer of 1 to 20, and
(V) an epoxy-containing polysiloxane compound having at least one epoxy group linked to a silicon atom via a carbon atom directly attached to the silicon atom per molecule.

2. The composition of claim 1 wherein the vinyl-containing diorganopolysiloxane has the formula:

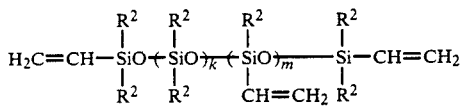  (2)

wherein $R^2$ is a monovalent hydrocarbon group having 1 to 10 carbon atoms and free of an aliphatic unsaturated bond, letter k is 0 or a positive integer, m is 0 or a positive integer, and the sum of k and m meets $0 < k + m \leq 10{,}000$.

3. The composition of claim 1 wherein the organohydrogenpolysiloxane has the formula

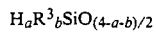  (3)

wherein $R^3$ is a monovalent hydrocarbon group having 1 to 10 carbon atoms and free of an aliphatic unsaturated bond, and letters a and b have values in the range: $0 < a < 2$, $1 \leq b \leq 2$, and $2 \leq a + b \leq 3$.

4. The composition of claim 1 wherein the organohydrogenpolysiloxane is present with the vinyl-containing diorganopolysiloxane in such an amount that the organohydrogenpolysiloxane affords 2 to 4 hydrogen atoms per vinyl group of the diorganopolysiloxane.

5. The composition of claim 1 wherein the amount of platinum or platinum compound is in the range of from 0.1 to 100 parts by weight of platinum per million parts of the total weight of the vinyl-containing diorganopolysiloxane and the organohydrogenpolysiloxane.

6. The composition of claim 1 wherein the epoxy-containing polysiloxane compound has the formula:

  (4)

wherein $R^4$ is

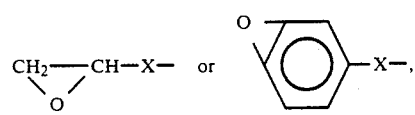

$R^5$ is hydrogen or a monovalent hydrocarbon group having 1 to 10 carbon atoms, Y is a divalent organic group having 1 to 6 carbon atoms, and letters c and d have values in the range: $0 < c \leq 1$, $1 \leq d < 3$, and $1.5 \leq c + d \leq 3$.

7. The composition of claim 1 wherein the ester siloxane compound is present in an amount of 0.01 to 5% by weight and the epoxy-containing organopolysiloxane is present in an amount of 0.1 to 5% by eight, both based on the total weight of the vinyl-containing diorganopolysiloxane and the organohydrogenpolysiloxane.

8. A silicone rubber composition comprising
(I) a vinyl-containing diorganopolysiloxane having at least two $CH_2{\equiv}CH{-}Si{\equiv}$ bonds per molecule, said vinyl-containing diorganopolysiloxane having the formula:

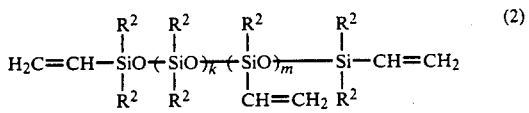  (2)

wherein $R^2$ is a monovalent hydrocarbon group having 1 to 10 carbon atoms and free of an aliphatic unsaturated bond, letter k is 0 or a positive integer, m is 0 or a positive integer, and the same of k and m meets $0 < k + m \leq 10{,}000$,
(II) an organohydrogenpolysiloxane having at least two hydrogen atoms directly attached to silicon atoms per molecule, said organohydrogenpolysiloxane having the formula:

  (3)

wherein $R^3$ is a monovalent hydrocarbon group having 1 to 10 carbon atoms and free of an aliphatic unsaturated bond, and letters a and b have values in the range: $0 < a < 2$, $1 \leq b \leq 2$, and $2 \leq a + b \leq 3$, said organohydrogenpolysiloxane being present with said vinyl-containing diorganopolysiloxane in such an amount that the orgnaohydrogenpolysiloxane affords 2 to 4 hydrogen atoms per vinyl group of the diorganopolysiloxane,
(III) platinum or a platinum compound in an amount of 0.1 to 100 parts by eight of platinum per million parts of the total weight of said vinyl-containing diorganopolysiloxane and said orgnaohydrogenpolysiloxane,
(IV) an ester siloxane compound free of silicon-to-carbon bond having the general formula:

  (1)

wherein $R^1$ is a monovalent hydrocarbon group having 1 to 10 carbon atoms and free of an aliphatic unsaturated bond, and letter n is 0 or a positive integer of 1 to 20, in an amount of 0.01 to 5% by weight based on the total weight of said vinyl-containing diorganopolysiloxane and said organohydrogenpolysiloxane, and
(V) an epoxy-containing polysiloxane compound having at least one epoxy group linked to a silicon atom via a carbon atom directly attached to the silicon atom per molecule, said epoxy-containing polysiloxane compound having the formula:

$$R^4{}_c R^5{}_d SiO_{(4-c-d)/2} \quad (4)$$

wherein $R^4$ is

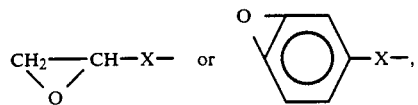

$R^5$ is hydrogen or a monovalent hydrocarbon group having 1 to 10 carbon atoms, X is a divalent organic group having 1 to 6 carbon atoms, and letters c and d have value sin the range: $0 < c \leq 1$, $1 \leq d < 3$, and $1.5 \leq c+d \leq 3$, said epoxy-containing polysiloxane compound being present in an amount of 0.1 to 5% by weight based on the total weight of said vinyl-containing diorganopolysiloxane and said organohydrogenpolysiloxane.

9. A cured product obtained by curing the silicone rubber composition of claim 1.

* * * * *